United States Patent
Fernández Gomez et al.

(10) Patent No.: US 7,076,949 B2
(45) Date of Patent: Jul. 18, 2006

(54) SYSTEM FOR MULTIPLE HARNESSING AND COMPLEMENTED CONVERSION OF ENERGY FROM SEA WAVES

(75) Inventors: José Joaquín Fernández Gomez, Cerdanyola Del Valles (ES); Javier Fernández Gomez, Cerdanyola Del Valles (ES); Abel Cucurella Ripoll, Cerdanyola Del Valles (ES); Rafael Ibáñez Lostal, Cerdanyola Del Valles (ES); Alfons Guell Ferre, Cerdanyola Del Valles (ES)

(73) Assignee: Pipo Systems, S.L., Cerdanyola del Valles (ES)

( * ) Notice: Subject to any disclaimer, the term of this patent is extended or adjusted under 35 U.S.C. 154(b) by 0 days.

(21) Appl. No.: 10/541,167

(22) PCT Filed: Jan. 5, 2004

(86) PCT No.: PCT/IB2004/000054

§ 371 (c)(1),
(2), (4) Date: Jun. 30, 2005

(87) PCT Pub. No.: WO2004/063562

PCT Pub. Date: Jul. 29, 2004

(65) Prior Publication Data

US 2006/0080957 A1    Apr. 20, 2006

(30) Foreign Application Priority Data

Jan. 10, 2003    (ES)    ................................ 200300051

(51) Int. Cl.
    *F03C 1/00*    (2006.01)

(52) U.S. Cl. ............................ 60/498; 60/500; 60/503; 60/504; 60/505

(58) Field of Classification Search .................. 60/495, 60/496, 497, 498, 500, 502, 503, 504, 505
See application file for complete search history.

(56) References Cited

U.S. PATENT DOCUMENTS

| | | | | |
|---|---|---|---|---|
| 4,203,294 A | * | 5/1980 | Budal et al. | 60/497 |
| 4,241,579 A | * | 12/1980 | Borgren | 60/504 |
| 4,603,551 A | | 8/1986 | Wood | 60/496 |
| 4,631,921 A | * | 12/1986 | Linderfelt | 60/501 |
| 4,883,411 A | * | 11/1989 | Windle | 417/331 |
| 5,701,740 A | * | 12/1997 | Tveter | 60/505 |
| 6,226,989 B1 | | 5/2001 | Fredriksson et al. | 60/501 |

FOREIGN PATENT DOCUMENTS

| | | |
|---|---|---|
| DE | 3912943 | 11/1989 |
| DE | 4143011 | 4/1993 |

* cited by examiner

*Primary Examiner*—Hoang Nguyen
(74) *Attorney, Agent, or Firm*—Wolf Block Schorr & Solis-Cohen LLP (57) ABSTRACT

System for multiple harnessing and complemented conversion of energy from sea waves. The system includes a structure of vertical guides along which the central floating body moves, a submerged captive-air tank, held up by the floating body, with the body and the tank so arranged that the movement of the submerged tank is contrary to that of the central floating body. The movement of the central floating body and of the submerged tank is transmitted to the means of conversion of the movement into pneumatic, electrical or hydraulic energy. The system shows high energy harnessing efficiency.

18 Claims, 11 Drawing Sheets

SYSTEM FOR MULTIPLE HARNESSING AND COMPLEMENTED CONVERSION OF ENERGY FROM SEA WAVES

This invention relates to a system for multiple harnessing and complemented conversion of energy from sea waves.

BACKGROUND OF THE INVENTION

Known in the art are systems for generating energy from sea waves based on the utilisation of the buoyant forces that act on a floating body anchored or ballasted on the seabed. The working travel the floating body effects under the action of the buoyant forces is used to obtain energy.

Such simple systems that harness energy by flotation nevertheless have the disadvantage that the travel used to harness power proportionally reduces the travel devoted to carrying out work. The capacity of the buoyant generators is therefore limited always by the dimensions of the floating body, wave height and wave frequency per minute.

Energy harnessing systems that make use of buoyant forces are clean and simple, but rather uncompetitive systems, if the necessary dimensions and the low harnessing of energy are taken into account. These are techniques in need of a substantial increase in energy harnessing and conversion if the installation is to be made profitable.

Also known are systems such as those described above which include at least one floating body ballasted or anchored onto the seabed, and means for conversion of the vertical movement of the floating body into pneumatic, electrical or hydraulic energy.

Such systems nevertheless have the disadvantage of harnessing and transforming only part of the natural forces contained in the waves, namely the forces due to thrust, also called buoyant forces.

Also known are systems for generating energy from sea waves which, instead of the buoyant forces, take advantage of the natural forces produced by the changes of water column brought about by the sea waves. Such systems nevertheless again have the disadvantage of only partially harnessing the energy contained in the sea waves.

Unknown as yet are systems for generating energy from sea waves which take advantage both of the buoyant forces and the natural forces produced by changes of water column occasioned by sea waves.

DESCRIPTION OF THE INVENTION

The objective of this invention is to resolve the disadvantages mentioned by developing a system for multiple harnessing and complemented conversion of energy from sea waves which, in addition to using the buoyant forces also uses the forces produced by changes of water column occasioned by sea waves.

In accordance with this objective, the system of this invention is characterised in that it includes a structure of vertical guides along which said central floating body moves, a submerged captive-air tank open at its lower base, held up by said floating body and also movable along said structure of vertical guides, means for transmitting the movement of said floating body to said submerged tank, with the body and the tank so arranged that the movement of the submerged tank is contrary to that of the floating body, the movement of the central floating body and of the submerged tank being transmitted via means of transmission of the movement to said means of conversion of the movement into pneumatic, electrical or hydraulic energy.

Thanks to these characteristics the system shows high energy harnessing efficiency since it manages at low cost to harness most of the energy present in a renewable source of energy such as the energy contained in sea waves. It is a system that permits the multiple harnessing and complemented conversion of energy.

The multiple harnessing of energy is that due to the thrust of the waves themselves and the pressures of the water column on the captive air of the submerged tank. The complemented conversion of energy is due to the complementary action exercised between the central floating body and the submerged tank.

In accordance with the invention, the system includes at least one peripheral floating body having a density of 0.5 g/cc, attached to said structure of vertical guides, which compensates the mass and thrust variations exerted by the oscillatory operation of the system. Preferably, said at-least-one peripheral floating body has a ring shape surrounding the vertical guides structure.

Due to said peripheral floating body a vertical position of the guides structure can be achieved which is unrelated to and unaffected by the movement of the waves and can optimally and effectively take advantage both of the buoyant forces of the central floating body and the forces produced by the pressure variations due to changes of water column on the captive air in the submerged tank.

In accordance with a preferred embodiment of the invention, said central floating body preferably includes a receptacle with air under pressure, at least one pneumatic actuator mounted inside said receptacle, with the upper chamber of said actuator connected to the submerged tank and the lower chamber, which is open at its base and exposed to the air under pressure of said receptacle.

The at-least-one pneumatic actuator is preferably a cylinder.

Thanks to this characteristic, the small water-column variations that occur practically from the start of the ascending or descending travel of the floating body give rise to an exchange of air volumes between the upper chambers of the pneumatic actuators or cylinders and the submerged air tank. These pressure changes and air-volume exchanges generate forces which complement the buoyant forces and act with maximum intensity from practically the start of the floating body's working travel.

Preferably, said movement transmission means include a rotation inverter, a multiplier, a variable speed device and a flywheel.

According to a preferred embodiment of the invention, said means of movement transmission further include a toothed rack engaging at each of its sides two gearwheels which transmit the movement of the floating body to said rotation inverter.

Advantageously, the piston rod of said at-least-one pneumatic cylinder includes means for driving a moving platform located on the upper receptacle of the central floating body and traversed by the toothed rack, with the gearwheels mounted rotating on the platform.

Thanks to these characteristics, the forces generated with the exchange of air volumes between the upper chambers of the cylinders and the submerged tank are used by the central floating body cylinders themselves to drive the moving platform traversed by the toothed rack. The driving of the platform is translated into a change of the transmission point and, therefore, into an extension of the working travel runs of the central floating body, so that the energy conversion of the system is complemented thereby.

Preferably, said means for conversion of the movement into energy comprise at least one electrical generator, one pneumatic pump or one hydraulic pump.

Preferably, too, the system includes telescopic tubes which house at least the means of transmission of the movement of the floating body to the submerged tank and the toothed rack.

Thanks to these telescopic tubes, the described items housed inside them are protected against the direct action of the sea water.

In accordance with the invention, the system includes a plurality of modules, each of which has a central floating body and a submerged captive-air tank, attached to the central floating body.

The modular design permits the construction of banks of buoyant units or modules.

Preferably, each one of said banks includes a structure which links together at the top ends the vertical guide structures of the various modules making up the bank. Advantageously, said upper structure includes watertight modular compartments which include, for each module, the transmission elements that in turn include the gearwheels and the rotation inverter. Also preferably, the toothed rack of each one of said modules is attached onto the platform of each module's central floating body and is of sufficient length to engage the gearwheels located in the corresponding watertight compartment of said upper structure of the array. Advantageously, each of the banks includes a ballast common to all the modules, a single ballast chain or cable connected to a swivelling mooring located on said ballast and a single transmission cable to take the energy to dry land.

Thanks to these described characteristics of the modular design, the upper structure of each of the banks can have a common transmission shaft which receives the forces harnessed by each buoyant unit or module of the bank. This common shaft transmits the harnessed forces to a multiplier, a variable speed device, a flywheel and, finally, to a single piece of energy-conversion equipment, with all these means of transmission and equipment being located on the upper structure of the bank.

According to a preferred embodiment, said central floating body has a cavity containing captive air inside it.

Thanks to the fact that the central floating body has a captive-air cavity inside it, any vertical movement produces an alteration of the air volume. This alteration is translated into forces which are added to the forces of harnessing and releasing the thrust of the waves of the masses, at changes of direction, thereby leading to an increase in the working travel effected by said central floating body. Moreover, the forces that give rise to the change of volume of said captive air, by acting in a direction opposite to the thrust or weight of the submerged tank, assist the direction change of the central floating body at the ends of the wave-travel runs.

According to another preferred embodiment of the invention, the system further includes a plurality of peripheral floating bodies, attached to said central floating body by means of tilting attachment structures.

The presence of these peripheral floating bodies boosts the system's complemented energy conversion, due to the complementary action exercised between the central floating body and the peripheral floating bodies.

Advantageously, said means of converting the movement into energy further include a number of pneumatic cylinders actuated by said tilting attachment structures.

Preferably, said peripheral floating bodies each include two peripheral pneumatic cylinders which compress the air from one of the cylinders of the central floating body, the tilting structure of each one of the floating body cylinders including a bar articulated at one end onto the rod of said cylinder and at the other end onto a lever whose ends are in turn articulated onto the ends of the peripheral pneumatic cylinder rods, with the distance between the two points of articulation onto said bar being substantially the same as the distance between the crest and the trough of a wave.

Advantageously, one of the two peripheral pneumatic cylinders compresses the air from the other peripheral pneumatic cylinder.

Advantageously, each one of the pneumatic cylinders of the central floating body and the two corresponding peripheral pneumatic cylinders constitutes three-stage linear pneumatic pumps.

Preferably, the compressed air produced by the system is stored in the chambers of each one of said peripheral floating bodies.

Alternatively, the system further includes a number of reverse osmosis membranes for directly converting the hydraulic energy obtained into desalinated water.

BRIEF DESCRIPTION OF THE DRAWINGS

For a better understanding of all that has been explained some drawings are attached which, schematically and solely by way of non-restrictive example, show two practical cases of embodiment.

In the drawings.

DESCRIPTION OF TWO PREFERRED EMBODIMENTS

FIGS. 1, 1a, 2, 3 and 4 of this invention show a first practical embodiment of the system for multiple harnessing and complemented conversion of energy from sea waves, which includes a central floating body 1, three peripheral floating bodies 2a, 2b, 2c attached to said floating body 1, and a submerged tank 4 for captive air 5, also attached to said central floating body 1 and open at its lower part to permit the entry of sea water 6.

Figure 1:
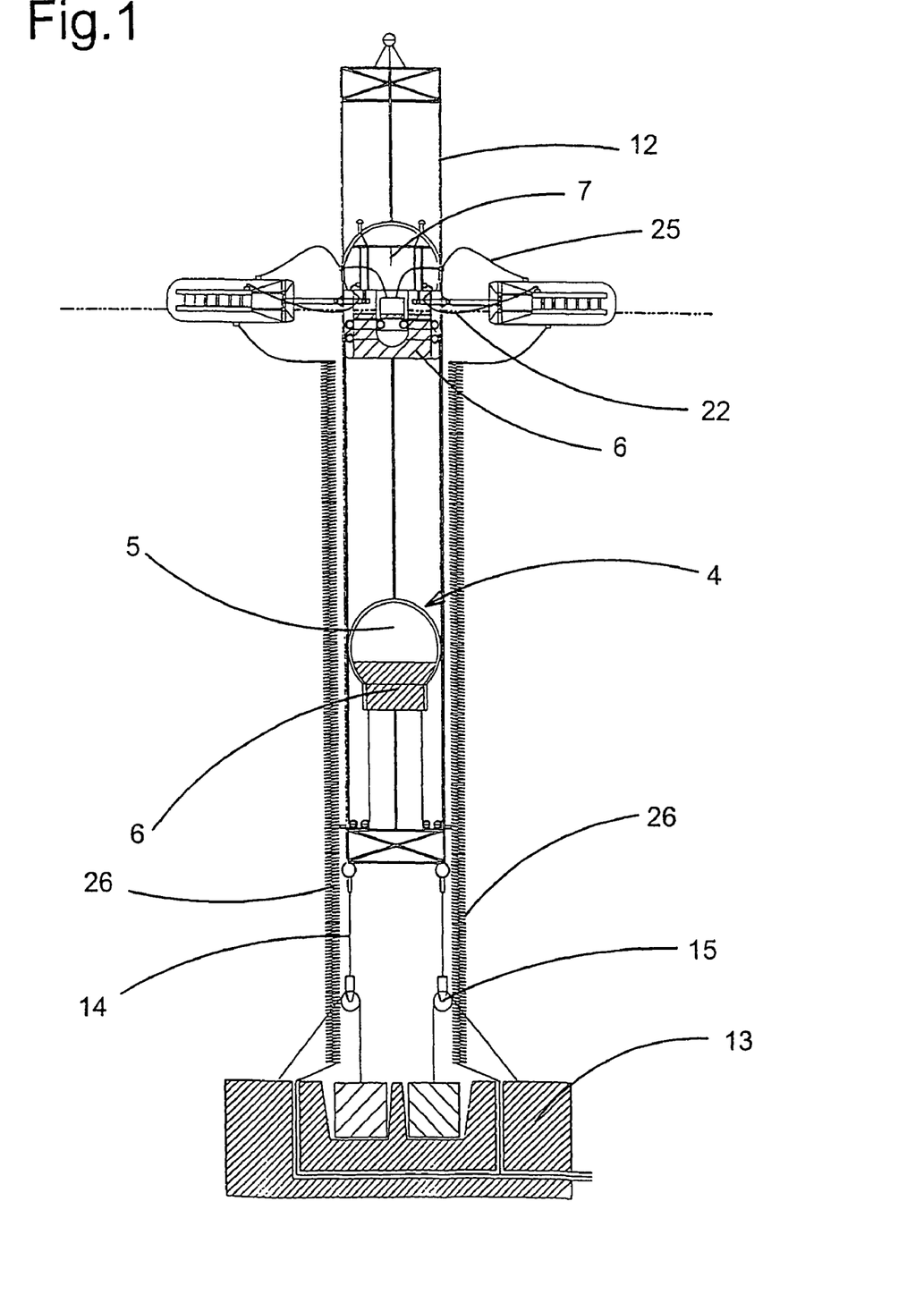
FIG. 1 is a section view in elevation of a first preferred embodiment of the system of the invention, in the calm sea position.
Figure 1A:
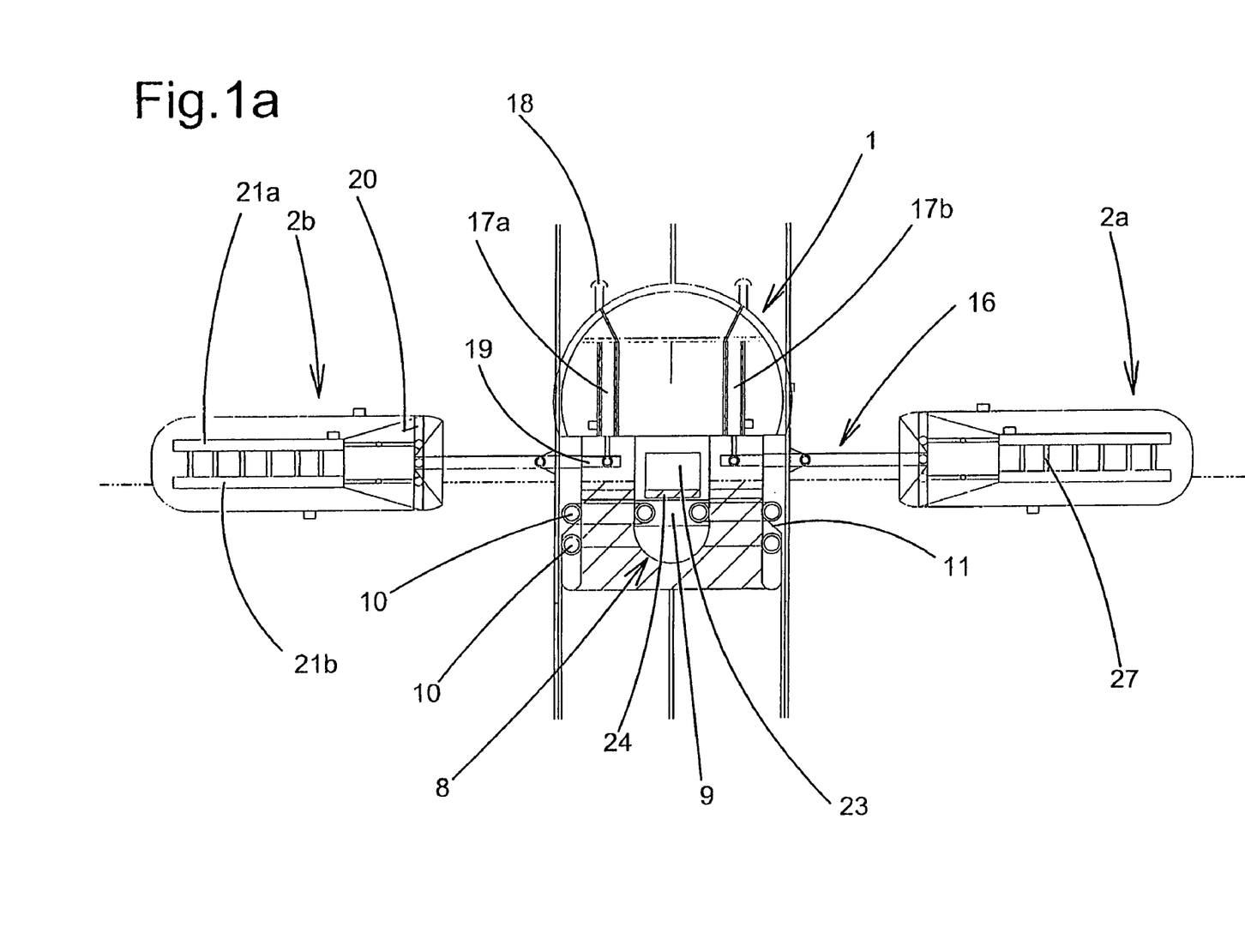
FIG. 1a is a detail of the floating bodies of that section.

The central floating body 1 is made up of cylindrical ring partially integrated into another hemispherical body, in such a way that both bodies form a cavity which contains captive air 7 and sea water 6 inside it. The interior of this cavity houses a watertight oval body 8, partly integrated into the hemispherical body. The watertight oval body 8 has inside it, among other components, a rotation inverter mechanism 9 comprising two smooth or toothed wheels which engage two belts, chains or cables 11 attached in turn to the pulleys 10 and hold up the submerged tank 4 at their opposite end. Both the central floating body 1 and the submerged tank 4 move vertically along a rectangular structure 12 made of tubular steel, carbon or fibreglass. Both bodies are dynamically linked through the belts, chains or cables 11 and the pulleys 10. The upper base of the rectangular structure 12 has an acoustic and visual signal, and the structure is anchored at its lower part to concrete structures 13 set on the seabed. Said structure of vertical guides 12 keeps the central floating body 1 and the submerged tank 4 aligned in order to avoid lateral movements.

The rectangular structure 12 is anchored to the concrete structure 13 set down on the seabed by means of the chains 14 and the pulleys 15 which constitute a double anchorage system that would only act under extreme sea conditions, allowing the system to withstand waves over 14 metres in height.

The three peripheral floating bodies 2a, 2b, 2c are attached to the central floating body 1 via a tilting structure 16 made of steel. The distance between the centre of the central float 1 and the end of the tilting structure 16, attached to the peripheral floats 2a, 2b, 2c, coincides with the nominal distance between troughs and crests of the waves at a given point in the sea.

The central floating body 1 has three pneumatic cylinders 17a, 17b, 17c for compressed-air production and including an air intake 18 at atmospheric pressure. Each one of these cylinders is attached to a peripheral floating body 2a, 2b, 2c by means of the tilting structure 16. This structure 16 includes a bar 19 articulated at one end onto the rod of a pneumatic cylinder 17 of the central body 1, and at the other end onto a lever 20, whose ends are in turn articulated onto the ends of the rods of two peripheral pneumatic cylinders 21a, 21b. These peripheral pneumatic cylinders 21a, 21b are mounted inside each of the peripheral floating bodies 2a, 2b, 2c.

The cylinders, both of the central floating body 1 and of the peripheral floating bodies 2a, 2b, 2c, are driven via the tilting structures 16 which transmit the cyclical movement those bodies make under the action of the sea waves.

The peripheral pneumatic cylinders 21a, 21b compress the air under pressure that comes through the duct 22 of the respective cylinder 17, located in the hemispherical body of the central float 1. The cylinders of the central floating body and of the peripheral floating bodies 2a, 2b, 2c constitute a three-stage linear pneumatic pump which converts the harnessed energy to pressurised air which is stored in the peripheral floating bodies 2a, 2b, 2c themselves.

The central floating body 1 also has, inside its watertight oval body 8, a three-stage pneumatic rotary pump 23. This pump 23 is driven by a rotation inverter mechanism 9 through a flywheel 24 and a variable speed device which, together with the pulleys 10 and belts, chains or cables 11, transmits the cyclical vertical movement made by the central floating body 1 and the submerged tank 4 due to the action of the sea waves. The compressed air through the pneumatic rotary pump 23 is also stored, via the duct 25, in the peripheral floating bodies 2a, 2b, 2c.

The pressurised air accumulated in the peripheral floating bodies 2a, 2b, 2c is taken to dry land or to a fixed structure through the ducts 26 which carry the pressurised air to a compressed air accumulator tank situated in the coastal zone.

The system of the invention for the generation of energy from sea waves is a system for multiple harnessing and complemented conversion of energy.

The multiple harnessing is due to harnessing the thrust of the waves themselves and of the water-column pressures on the captive air in the submerged tank 4 and the floating body 1. The complemented conversion of energy is due to the complementary action which is exercised:

between the central floating body 1 and the submerged tank 4;

between the central floating body 1 and the peripheral floating bodies 2a, 2b, 2c;

in the central floating body 1 itself, due to the captive air 7 that body contains.

The complemented action between the central floating body 1 and the submerged tank 4 arises from changes in the pressure of the captive air 5 that tank contains, due to the changes of water column it undergoes.

Figure 2:
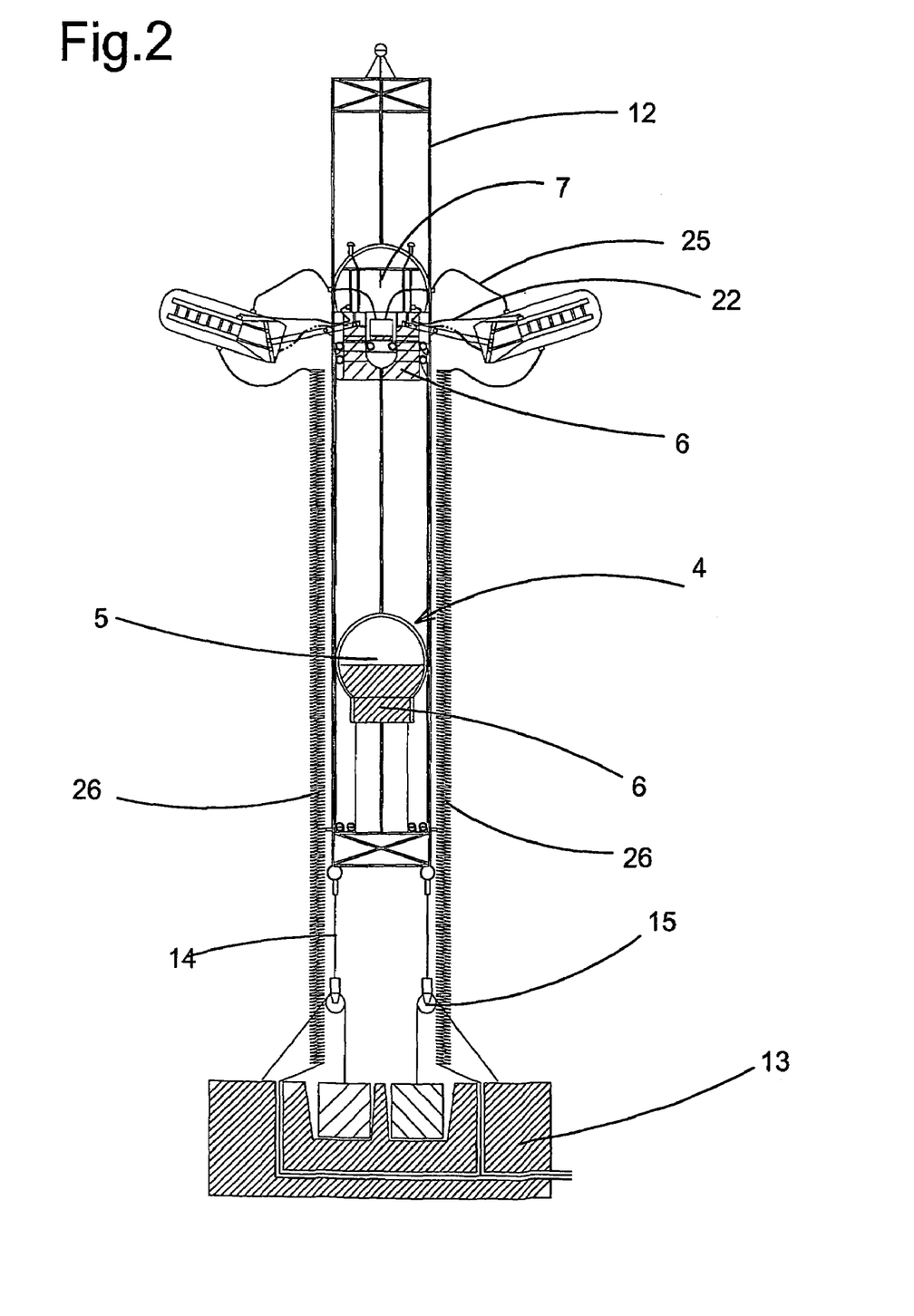
FIG. 2 is a section view in elevation of the first preferred embodiment of the system of the invention, in the crest-of-the-wave position.
Figure 3:
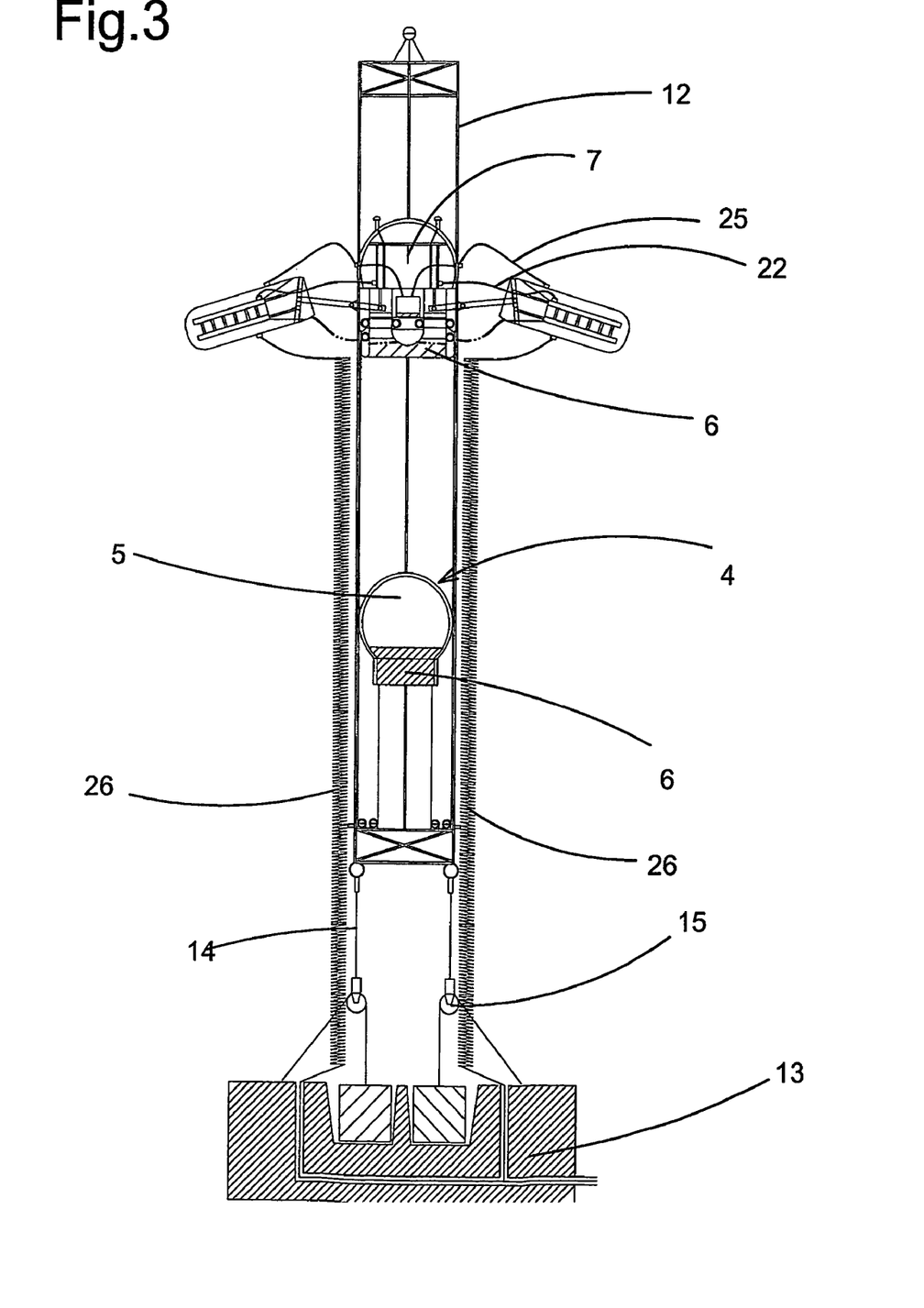
FIG. 3 is a section view in elevation of the first preferred embodiment of the system of the invention, in the trough-of-the-wave position.
Figure 4:
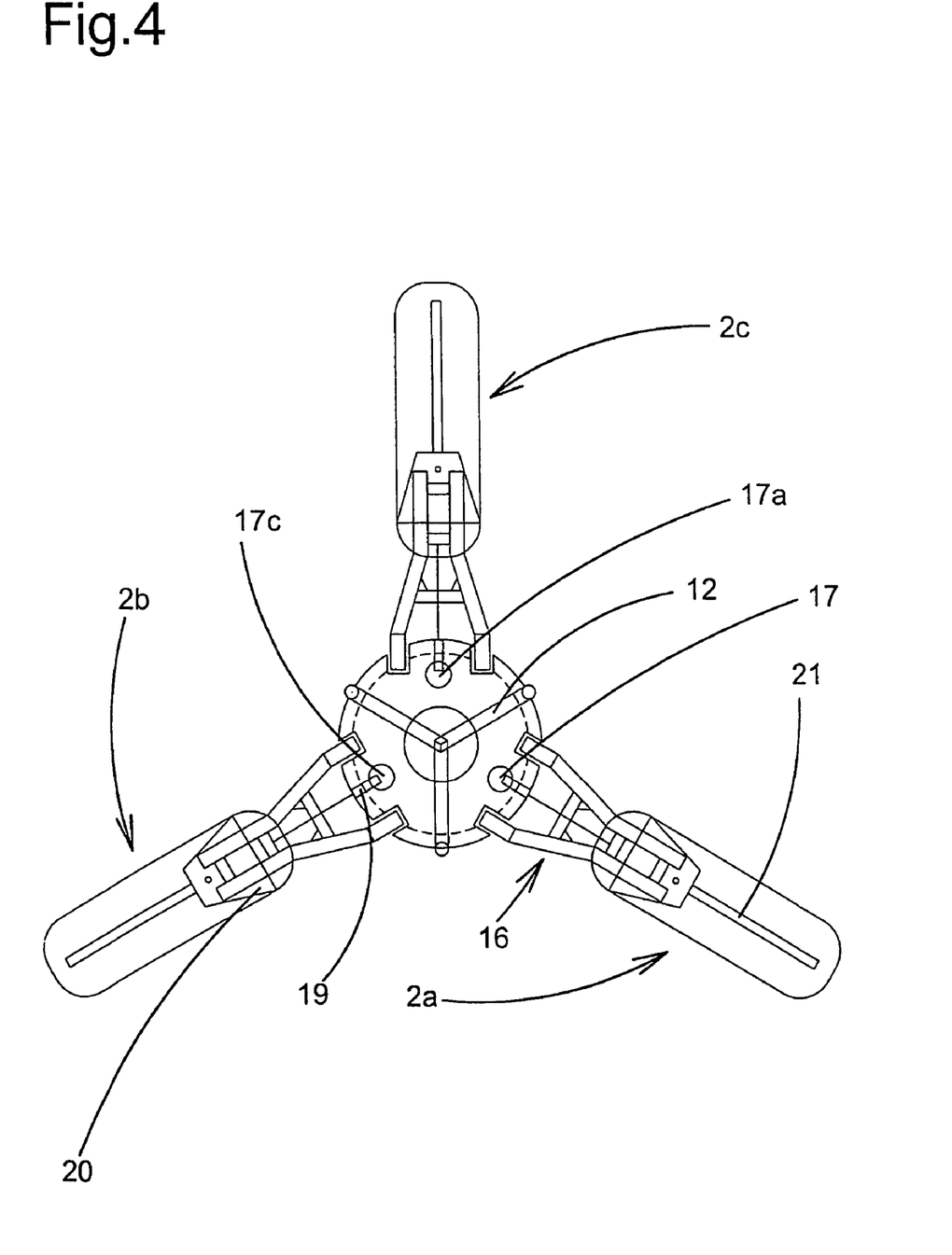
FIG. 4 is a schematic view of a cross-section of the upper part of the first preferred embodiment of the system of the invention.

As FIGS. 1, 2 and 3 show, the central floating body 1, when it moves driven by the energy of the sea waves, transmits that movement to the submerged tank 4 through the pulleys 10 and the belts, chains or cables 11. The submerged tank 4 moves in inverse direction to the movement of the central floating body 1, so that when the central floating body 1 is driven upwards by the waves the submerged tank 4 moves down and away from the surface. The travel undergone by the submerged tank 4 is the same as that of the central floating body 1, although it must be emphasised that the water column the tank gains under the thrust of the wave is always double the travel effected by the floating body 1.

As the submerged tank 4 moves away from the surface and the water column it bears increases, water 6 enters the tank 4, which gains weight and compresses the captive air 5 contained inside it. When the thrust of the waves on the central floating body 1 decreases, the captive air 5 tends to expand, so that water 6 emerges from the submerged tank 4 and the tank 4 moves closer to the surface, gaining thrust.

The expansion and contraction of the captive air 5 in the submerged tank 4, produced by the changes in the volume of air 5 due to the larger or smaller water column borne by the tank 4 as it moves, sets up forces (weight of the tank and thrust of the tank) that are transmitted to the central floating body 1 through the pulleys 10 and the belts, chains or cables 11. These forces are added to the thrust or weight of the central floating body 1 due to the action of the buoyant forces, complementing their effects and increasing the forces harnessed and the effectiveness of the working travel runs.

When the central floating body 1 receives the thrust of the wave and starts its upward travel, the submerged tank 4 starts its downward travel with a corresponding entry of water 6. The increased wave thrust is accompanied by a weight increase in the submerged tank 4, so that at the end of the travel, when the thrust force or buoyant force of the wave in minimal, the weight of the tank 4, at its maximum at that point, then acts in such a way that the thrust force is complemented by the weight of the tank 4. On the other hand, when the wave thrust decreases and the floating body 1 starts its downward travel, the submerged tank 4 starts its upward travel accompanied by an exit of water 6 due to expansion of the compressed captive air 5. The reduced wave thrust is accompanied by increased thrust of the submerged tank 4 (since the water 6 therein empties out with expansion of the compressed air 5), so that at the end of this travel, when the reduction of wave thrust is minimal, the thrust of the tank 4, at its maximum at that point, then acts and that thrust force of the central floating body 1 is thus complemented by the thrust of the tank 4.

Rather than interfering with each other, both the central floating body 1 and the submerged tank 4 boost and complement each other at the centre and at the ends of their respective vertical travel runs, with the thrusts or buoyant forces of the float 1 being added to the additional thrust or weight of the submerged tank 4. This permits considerable harnessing of energy from waves 1.50 m high with frequencies of 8 to 10 waves per minute.

The thrusts and weights of the floating body 1 are at their maximum buoyant intensity at the centre of the vertical ascending and descending travel runs of the waves, while the weight and thrust of the submerged tank 4 act in the same direction, but with nil intensity at the centre (thrusts and weight compensated) and maximum intensity at the ends. There is therefore an alternation of buoyant actions between the floating body 1 and the submerged tank 4 which tends to maintain the intensity of the force throughout the travel of the waves.

The complementary action between the central floating body 1 and the peripheral floating bodies 2a, 2b, 2c has its origin:
  in the particular arrangement of the tilting structure which links the peripheral floating bodies 2a, 2b, 2c with the central floating body 1;
  in the lower mass and inertia of the peripheral floating bodies 2a, 2b, 2c in relation to the central floating body 1;
  in the simultaneous action of the thrust or buoyant forces and the gravity forces generated by the peripheral floating bodies 2a, 2b, 2c themselves, which are transferred to the central floating body 1 in each vertical run.

The tilting of the peripheral floating bodies 2a, 2b, 2c has been arranged at a distance from the central floating body 1 which is equivalent to wavelength of the waves, in such a way that the effects of thrust and gravity coincide on both bodies.

The vertical movement to which the central floating body 1 is subjected due to the thrust forces caused by the waves and the pressures pull the peripheral floating bodies 2a, 2b, 2c in the same direction and manner. Due to their lower mass and inertia, however, these bodies respond first to the thrust and gravity at each direction change. The tilting linkage structures 16, which attach them to the central floating body 1, thus transmit the resulting thrust or buoyant forces to the respective cylinder 17 of the central floating body 1, driving it and producing compressed air at each change of direction or vertical travel.

Furthermore, the peripheral floating bodies 2a, 2b, 2c are subjected to an oscillatory movement due to the undulating movement of the sea and to their dimensions, which coincide with the wavelength of the sea waves. Their ends thus coincide alternately with the crests and/or troughs of the waves. The tilting of the peripheral floating bodies 2a, 2b, 2c on the bars 19 and the lever 20 is transmitted horizontally to the two cylinders 21a, 21b of each peripheral floating body 2a, 2b, 2c, which cylinders compress the compressed air from the respective cylinder 17 of the central floating body 1. As explained above, the cylinders of the central floating body 1 and of the peripheral floating bodies 2a, 2b, 2c constitute a three-stage linear pneumatic pump which convert the energy harnessed into pressurised air. The cylinders of each peripheral floating body 2a, 2b, 2c are connected by connecting ducts 27.

In order to double the air pressure in each stage the surface area of each cylinder has been reduced to half that of the preceding one, thus permitting identical intake and compression strokes to be maintained. Thus, starting from an atmospheric pressure or 1 kg/cm2 at the intake of the first stage (cylinders 17a, 17b, 17c) and applying forces that surpass the respective torques, the pressure increases to 2 kg/cm2 in the second stage (cylinder 21a of each of the peripheral floats) and to 4 kg/cm2 in the third and final stage (cylinder 21b of each of the peripheral floats).

Another complemented action of the system is that which originates in the captive air 7 in the cavity of the floating body 1. The captive air 7 in the cavity of the floating body 1 is at atmospheric pressure at the flotation line or line of neutral equilibrium of the whole. However, if it is taken into account that sea water 6 enters the cavity, it will be understood that any vertical movement of the floating body 1 gives rise to a change in the volume of air 7 which translates into a pressure on the ascent and a depression on the descent, which act on the interior cover of the central floating body 1 dome. The captive air 7 expands or contracts in the cavity of the central floating body 1 when it is sucked (during the descent) or subjected to pressure (during the ascent) by the water housed in the cavity itself. The forces set up by the captive air 7 are added to the forces of harnessing and release of the thrust and of the masses, at the direction changes, and therefore mean an increase of the working travel effected by the central floating body 1. Furthermore, the forces to which the captive air 7 give rise on the central floating body 1, by acting in a direction opposite to the thrust or weight of the submerged tank help, at the ends of the travel runs, to overcome and counteract the negative force of the submerged tank 4. That is, they assist the direction change of the central floating body 1.

FIGS. 5 to 9 show a second preferred embodiment of the system of the invention which includes a central floating body 1, a peripheral floating body 28 in the form of a circular ring attached to the structure of vertical guides 12, and a submerged tank 4 of captive air 5 of ring shape, attached to the said floating body 1 and open at its lower part to permit the entry of sea water 6.

Figure 5:
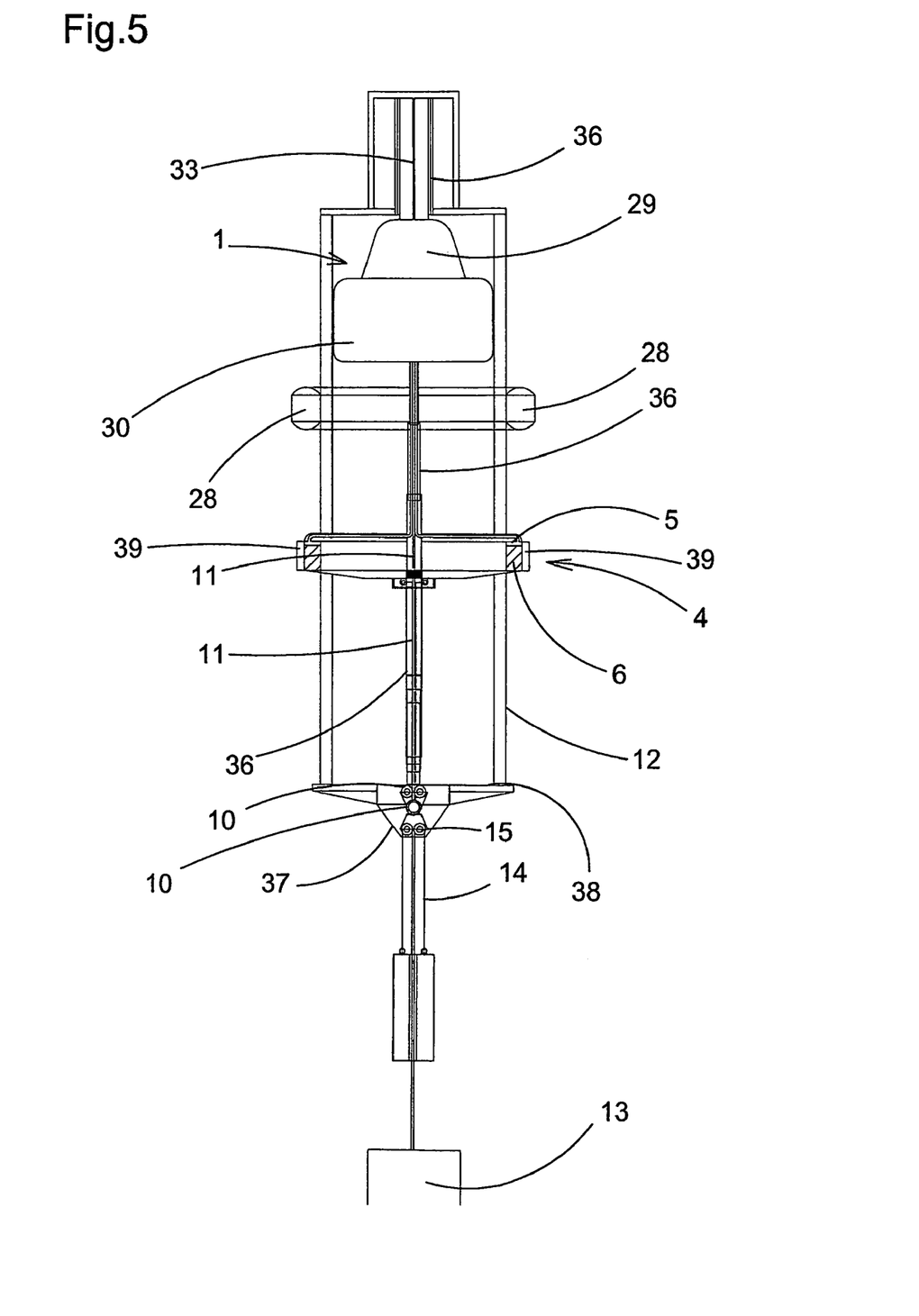
FIG. 5 is a section view in elevation of a second preferred embodiment of the system of the invention.

The central floating body 1 is made up of two watertight receptacles 29, 30, one upper receptacle 29 of truncated-cone shape and another lower receptacle 30 of cylindrical shape, which contain air 31 at a preset pressure. Both receptacles 29, 30 are traversed by a toothed rack 32 which is secured longitudinally to the structure of vertical guides 12 by means of cables 33 and tensioners 34. The toothed rack 32 engages on each of its sides with two gearwheels 35 which convert the movement of the floating body 1 over the length of said rack 32 into the rotary movement of two shafts with a particular working torque.

The submerged tank 4 is dynamically attached to the floating body 1 through the pulleys 10 and the connecting cables or chains 11, so that both move vertically along the structure of vertical guides 12, and in an opposite direction to each other, under the effect of the force of the waves.

The toothed rack 32, with the cables 33 and tensioners 34 which secure it to the structure 12, and together with the connecting cables or chains 11 of the floating body 1 and the submerged tank 4, are arranged inside telescopic tubes 36 which protect them from the direct action of the sea water. The pulleys 10, 15 of the system are also fitted inside a body 37 to protect them from the action of the sea water. Said body 37 is mounted on a compensating plate located on the lower base of the vertical guides structure 12, which plate acts as a dynamic anchorage of the working forces, maintaining the position of the longitudinal toothed rack 32 at each direction change.

The peripheral floating body 28 of the preferred embodiment described is a float having a density of 0.5 g/cc designed to offset the weight of the guides structure 12, as well as the forces brought to bear by the submerged tank 4 and the central floating body 1, on the guides structure 12 itself. A fixed vertical position of the guides structure 12 is thus achieved which is buffered from and unaffected by the movement and thrusts of the waves and takes advantage optimally and effectively of both the buoyant forces which act on the central floating body 1 and the forces produced by the changes of water column on the captive air 5 of the submerged tank 4.

The structure of the submerged tank 4 is preferably designed with air chambers 39 whose function is to compensate the weight of the structure of the submerged tank 4 itself, so that the influence of the weight of said structure on the system as a whole will be nil. This arrangement achieves the result that the forces generated by the submerged tank 4 are transmitted optimally and effectively to the central floating body 1.

The watertight lower receptacle 30 of the central floating body 1 includes four pneumatic cylinders 40 which drive a moving platform 41 situated on the upper watertight receptacle 29 of the floating body 1 itself. The means for transmitting the movement of the floating body 1 and the means for converting the movement into energy are mounted on that platform 41.

Figure 9:
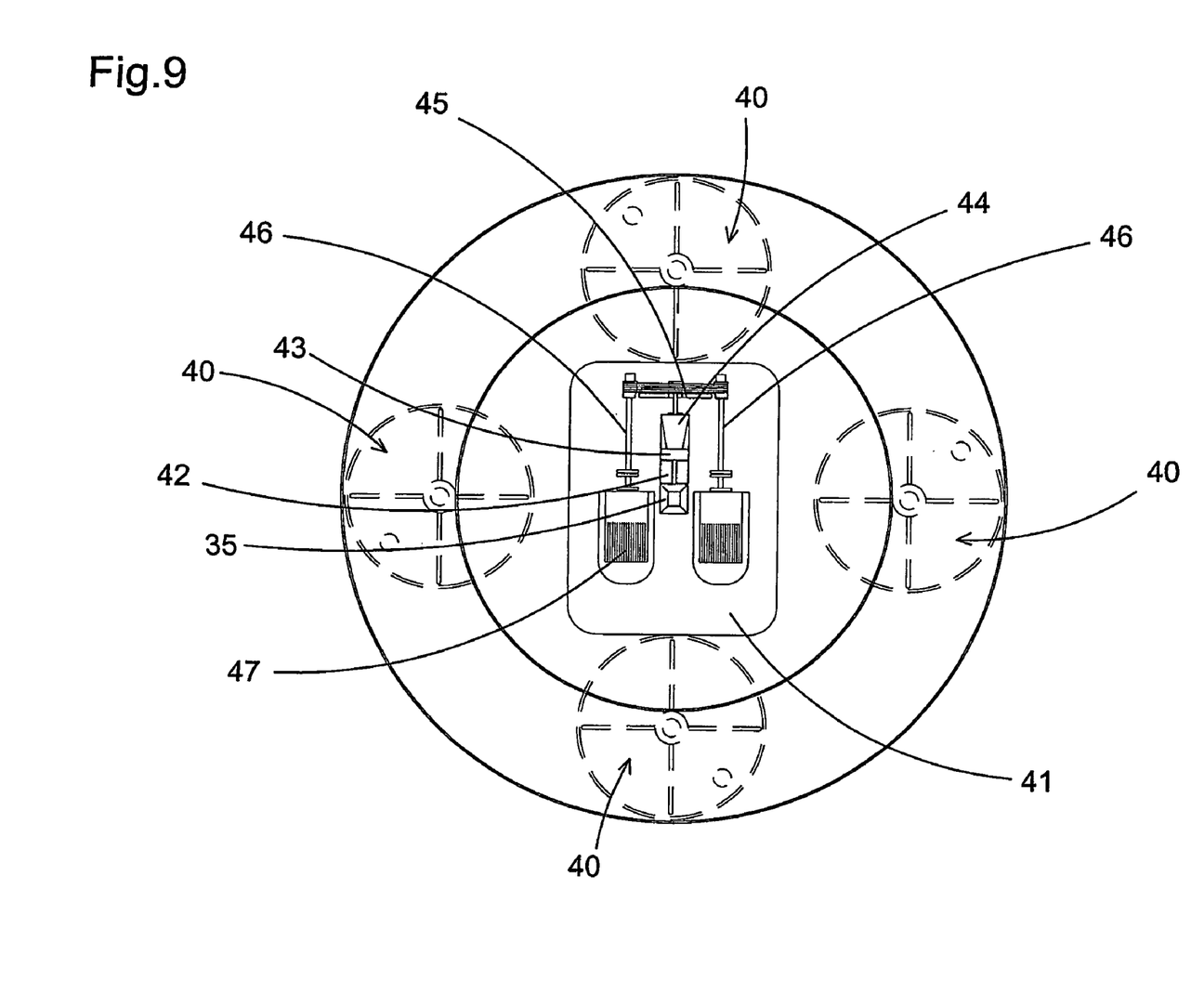
FIG. 9 is a schematic view showing the means of mechanical transmission and the means of energy conversion of the second preferred embodiment of the system of the invention, arranged on the moving platform of the upper watertight receptacle of the floating body.

Mechanical transmission of the movement of the floating body 1 to the energy converting means is carried out by the four gearwheels 35 engaged in the toothed rack 32 arranged longitudinally, which convert the straight-line movement of the floating body 1 into a rotary movement of two shafts. That rotary movement is in turn transmitted to a rotation inverter 42 with unidirectional output, which transmits the movement of a single drive shaft and the working force to a multiplier whose output is regulated by a variable speed device 44 and transmitted to a flywheel 45. In the preferred embodiment described the movement of the drive shaft is finally transmitted to two shafts 46 which in turn drive two electricity generators 47. In other preferred embodiments not shown, however, the movement of the drive shaft can be used to actuate a pneumatic energy compressor, reverse osmosis membranes equipment for desalinating sea water or, for example, hydrogen production equipment.

The means of mechanical transmission of the energy described in the preceding paragraph are designed so that the system works perfectly with waves of 1.5 to 4.5 metres in height and frequencies of between 5.5 and 7 per minute, obtaining in this working range a drive shaft rotation speed between 900 and 1500 r.p.m.

The pneumatic cylinders 40 located in the lower watertight receptacle each include two chambers 48, 49, one upper chamber 48 and another lower chamber 49, separated by the piston 50 of the cylinder 40. The upper chamber 48 is connected to the submerged tank 4 of captive air 5 through flexible pipes 51, arranged on wheels 52 with circular guides that enable them to be reeled in and out. The pressure of the air 5 in the upper chamber 48 of the cylinders 40 is equal to the pressure of the captive air 5 in the submerged tank 4, since both elements are connected by the flexible pipes 51. The lower chamber 49 of the cylinders 40 is open at its base and is therefore subjected to the pressure of the air 31 contained in the free spaces of the lower watertight receptacle 30 of the floating body 1.

Figure 7:
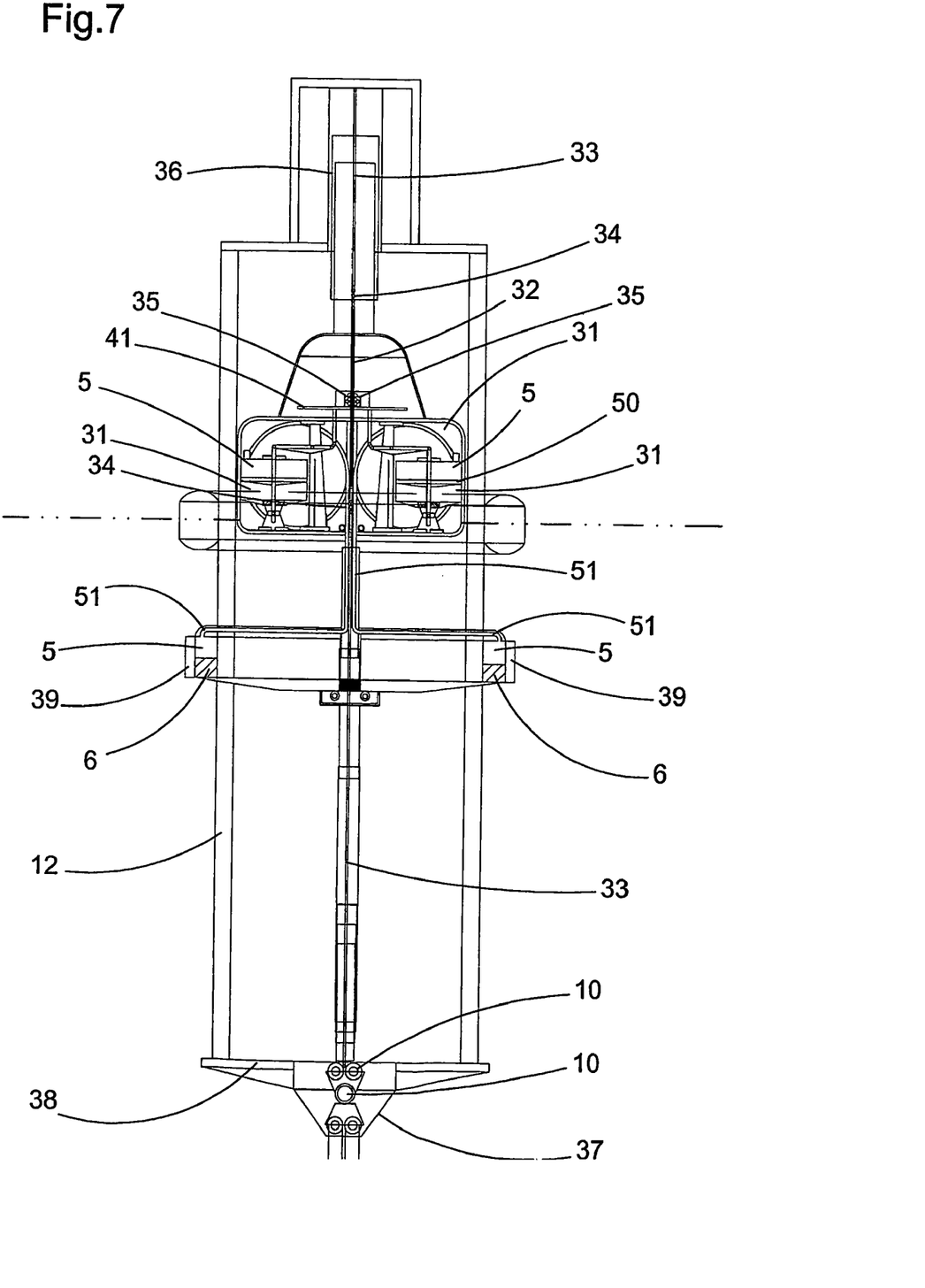
FIG. 7 is a section view in elevation showing a part of the second preferred embodiment of the system of the invention, in the calm sea position.
Figure 7A:
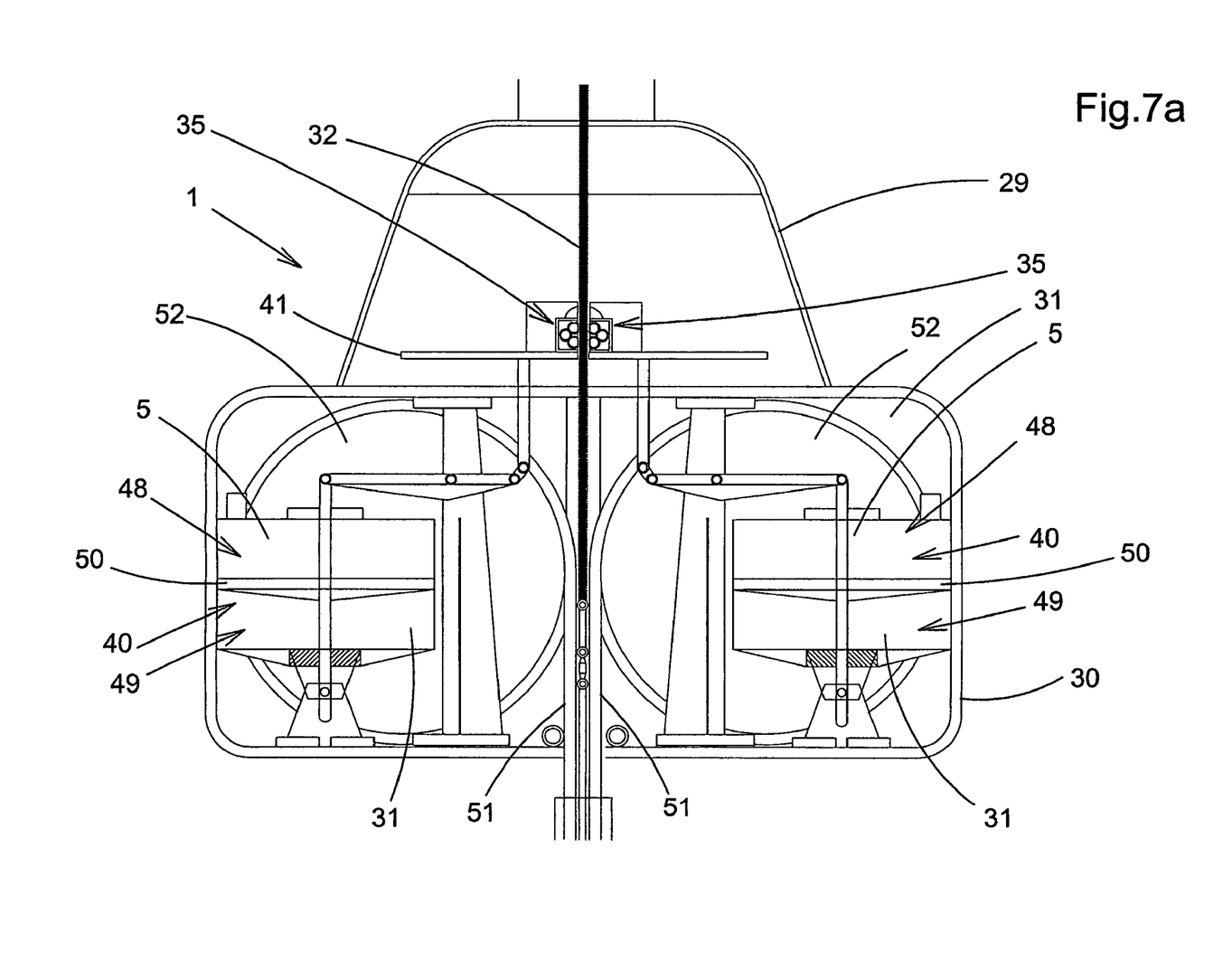
FIG. 7a is a detail of the central floating body of this section.

In calm-sea position, as shown in FIG. 7, the pressure of the air 31 contained in the free spaces of the lower watertight receptacle 30 is equal to the pressure of the air 5 in the submerged tank. In this position the platform 41 is at an intermediate point in its travel and the piston 50 of each cylinder 40, which separates the two chambers 48, 49, is in its intermediate position, since the air pressure in the two chambers 48, 49 is the same.

In the preferred embodiment described, the pneumatic cylinders 40 act as exchangers of the volume of captive air 5 in the submerged tank 4, so that any vertical movement produces a change in the volume of air 5 in the upper chambers 48 of the cylinders 40 and the submerged tank 4.

The complemented conversion of energy of the preferred embodiment shown in FIGS. 6 to 9 is due to the complementary action exerted:

between the central floating body 1 and the submerged tank 4;

in the central floating body 1 itself, due to the action of the pneumatic cylinders 40 on the drivable platform 41.

The complemented action between the central floating body 1 and the submerged tank 4 originates in the exchanges of captive air 5 volume in the upper chambers 48 of the pneumatic cylinders 40 and in the submerged tank 4, due to the changes of water column 6 borne by the tank 4.

Figure 6:
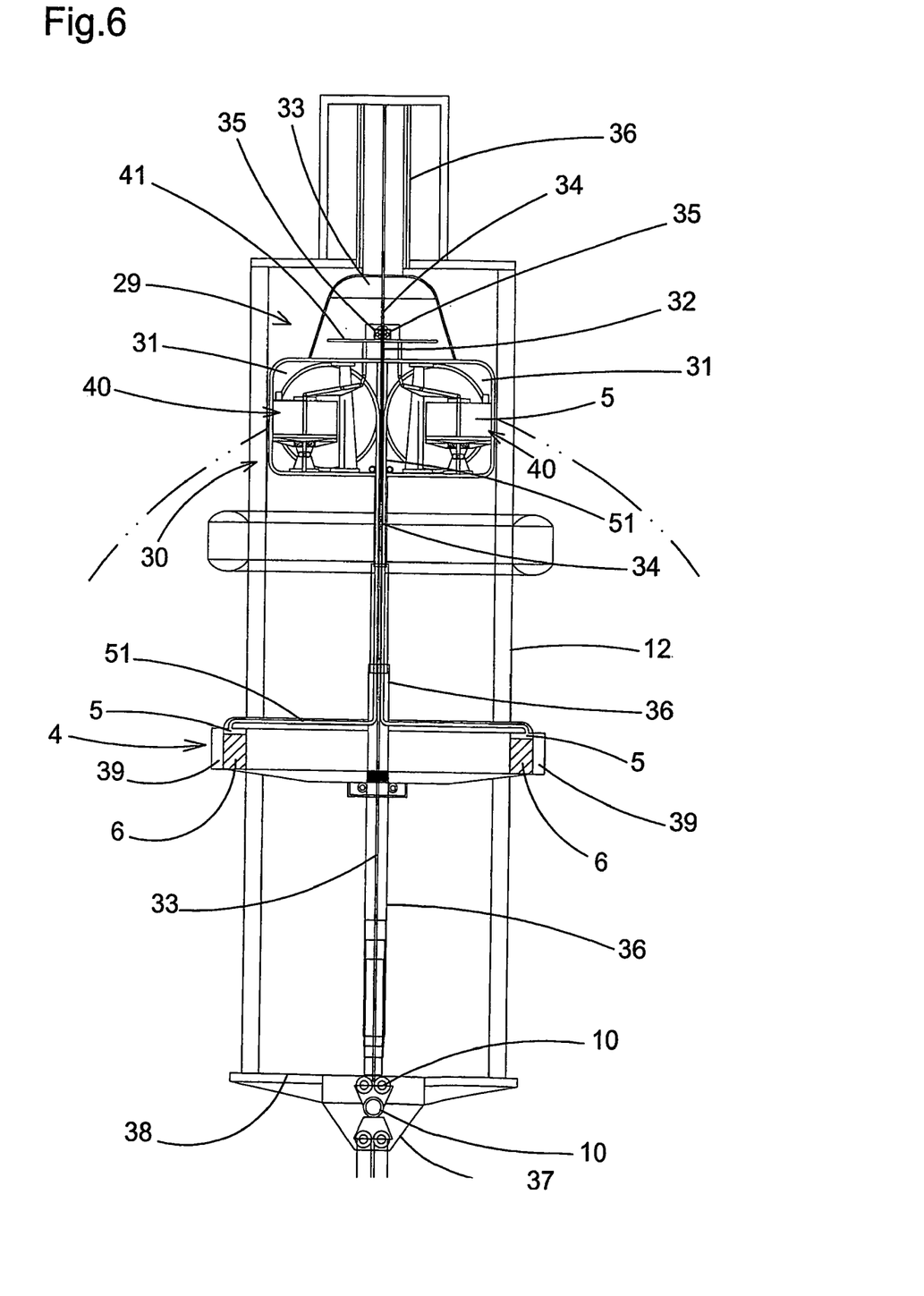
FIG. 6 is a section view in elevation showing a part of the second preferred embodiment of the system of the invention, in the crest-of-the-wave position.
Figure 8:
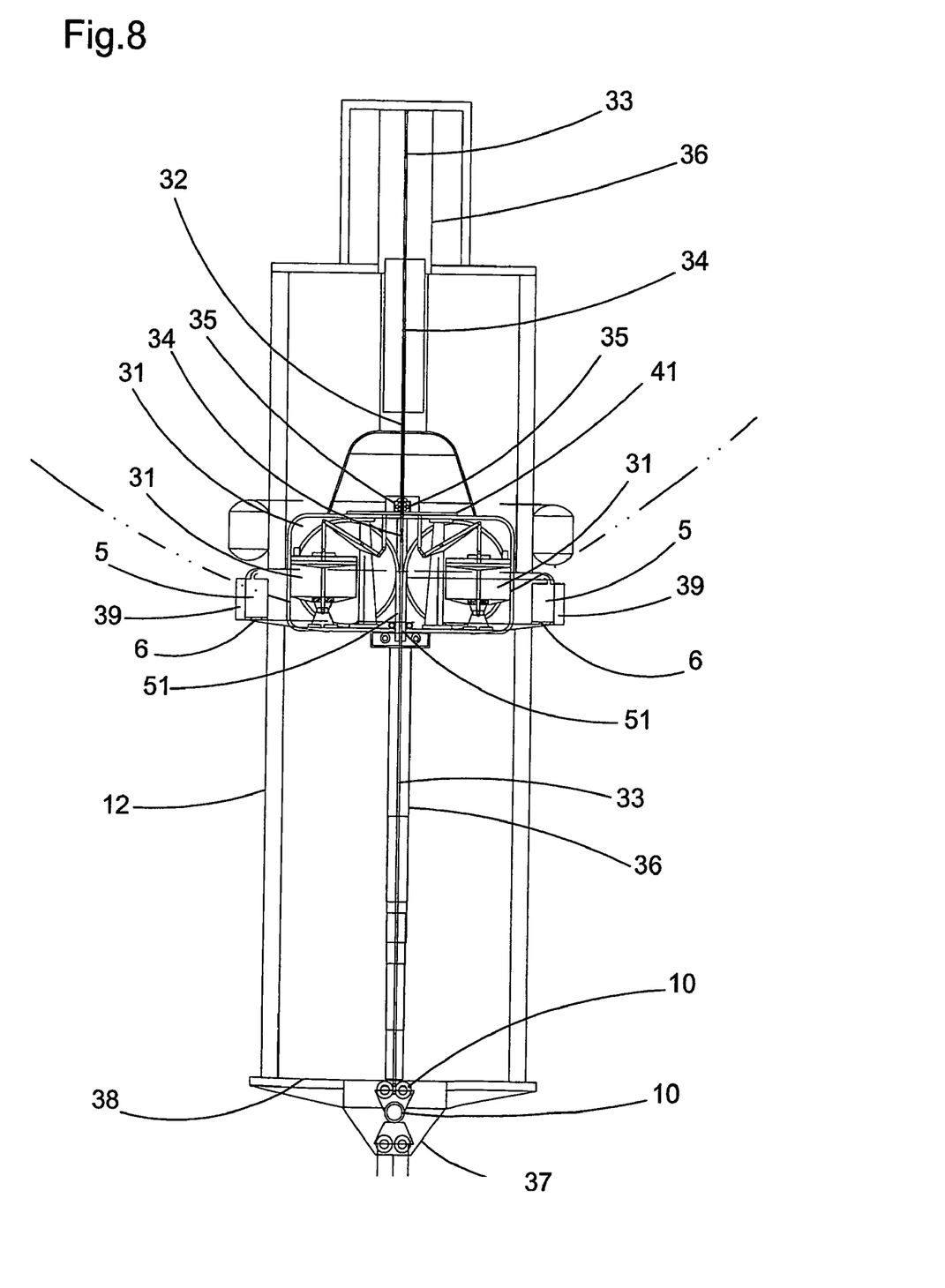
FIG. 8 is a section view in elevation showing a part of the second preferred embodiment of the system of the invention, in the trough-of-the-wave position.

FIG. 6 shows how, as the central floating body 1 moves away from the surface and the water column 6 borne by the submerged tank 4 begins to increase, water enters the tank and the captive air 5 it contains is transferred, through the flexible pipes 51, to the upper chambers 48 of the pneumatic cylinders 40. On the other hand, as FIG. 8 shows, when the thrust of the waves on the central floating body 1 begins to decrease and so too does the water column 6 borne by the submerged tank 4, water emerges from the tank, so the air 5 in the upper chambers 48 of the pneumatic cylinders 40 is transferred to the submerged tank 4 through the flexible pipes 51.

The pressure changes and exchange of volumes of air 5 between the upper chambers 48 of the pneumatic cylinders 40 and the submerged tank 4, produced by changes in the water column 6 borne by the submerged tank 4 as it moves, give rise to forces (weight of the tank and thrust of the tank) that are transmitted to the central floating body 1 through the pulleys 10 and the chains or cables 11, with maximum intensity of forces practically from the start of the working travel of the floating body 1.

Indeed, in the preferred embodiment described, the small variations of the water column 6 that occur when the ascending or descending travel of the floating body 1 is only just starting give rise to an exchange of air volumes 5 between the upper chambers 48 of the cylinders 40 and the submerged tank 4, which are translated into forces (weight of the tank and thrust of the tank) which act with maximum intensity of forces practically from the start of the working travel of the central floating body 1. These forces are added to the thrust or weight of the central floating body 1, due to the action of the buoyant forces and complementing their effects, with maximum intensity from practically the start of the travel, and they further accelerate the cyclical direction changes of the central floating body 1 at the ends of the travel runs.

The other complemented action observed in the preferred embodiment of the system as shown in FIGS. 5 to 9 has its origin in the central floating body 1 itself, and is due to the action of the pneumatic cylinders 40 on the moving platform 41.

When the central floating body 1 starts its ascending travel due to the thrust of the wave, the water column 6 borne by the submerged tank 4 increases, the pressure of the water column 6 leading to the volume of air 5 in the tank 4 being transferred to the upper chambers 48 of the pneumatic cylinders 40. The pressure of the air 5 in the upper chambers 48 of the cylinders 40 thus increases, driving the pistons 50 of those cylinders 40 downwards and thereby causing actuation of the moving platform 41 which carries out its ascending travel. The ascending movement of the platform 41 is transmitted to the gearwheels 35 of the transmission system which rests on the platform 41 itself, which gearwheels 35 are meshed in the toothed rack 32, resulting in a working travel which is added to that effected by the central floating body 1 itself due to the buoyant forces.

When the force of the wave decreases and the floating body 1 begins its descending travel, the water column 6 borne by the submerged tank 4 decreases, leading the reduction of the pressure of that water column 6, to the transfer of the volume of air 5 in the upper chamber 48 of the pneumatic cylinders 40 to the submerged tank 4. The pressure of air 5 of the upper chambers 48 of the cylinders 40 thus decreases in relation to the air pressure 5 of the lower chambers 49, which due to their being open at their base have the same preset air pressure 31 as that of the lower receptacle 30 of the central floating body 1. Thus the pressure difference between said chambers 48, 49 causes the piston to be driven upwards, thereby causing actuation of the platform 41 which implements its descending travel. The descending movement of the platform 41 is transmitted to the gearwheels 35 engaged in the toothed rack 32, resulting in a working travel which is added to that carried out by the central floating body 1 itself due to the buoyant forces.

The forces generated with the change of pressures and exchange of air volumes 5 between the upper chambers 48 of the pneumatic cylinders 40 and the submerged tank 4 are used by the central floating body's 1 cylinders 40 themselves to drive the moving platform 41 on which the transmission mechanisms of the central floating body's 1 movements are situated, thus extending the working travel runs of the floating body 1, so that the system's energy conversion is complemented thereby.

The invention claimed is:

1. System for multiple harnessing and complemented conversion of energy from sea waves, which includes a central floating body (1), means (23,47) for converting the movement of the system into pneumatic, electrical or hydraulic energy, provided or otherwise inside same, and means of transmission (26) of said energy to dry land or to a structure, wherein it includes a structure of vertical guides (12) along which said central floating body (1) moves, a submerged captive-air (5) tank (4) open at its lower base, held up by said floating body (1) and also movable along said structure of vertical guides (12), means (10, 11) for transmitting the movement of said floating body (1) to said submerged tank (4), with the body (1) and the tank (4) so arranged that the movement of the submerged tank (4) is contrary to that of the central floating body (1), the movement of the central floating body (1) and of the submerged tank (4) being transmitted via means (9,24,32,35,42,43,44, 45) of transmission of the movement to said means of conversion (23, 47) of the movement into pneumatic, electrical or hydraulic energy.

2. System according to claim 1, wherein it includes at least one peripheral floating body (28) having a density of 0.5 g/cc, attached to said structure (12) of vertical guides.

3. System according to claim 1, wherein said central floating body includes a receptacle (30) with air (31) under pressure, at least one pneumatic actuator mounted inside said receptacle, with the upper chamber (48) of said actuator connected to the submerged tank (4) and the lower chamber (49), which is open at its base and exposed to the air (31) under pressure of said receptacle (30).

4. System according to claim 3, wherein the at-least-one pneumatic actuator is a cylinder (40).

5. System according to claim 1, wherein said movement transmission means include a rotation inverter (9, 42), a multiplier (43), a variable speed device (44) and a flywheel (24, 45).

6. System according to claim 5, wherein said means of movement transmission further include a toothed rack (32) engaging at each of its sides two gearwheels (35).

7. System according to claim 4, wherein in that the piston rod (50) of said at-least-one pneumatic cylinder (40) includes means for driving a moving platform (41) located on the upper receptacle (29) of the central floating body (1) and traversed by the toothed rack (32), with the gearwheels (35) mounted rotating on the platform (41).

8. System according to claim 1, wherein the means for conversion of the movement into energy comprise at least one electrical generator (47), one pneumatic pump (23) or one hydraulic pump.

9. System according to claim 6, wherein it includes telescopic tubes (36) which house at least the means of transmission (10,11) of the movement of the floating body (1) to the submerged tank (4) and the toothed rack (32).

10. System according to claim 1, wherein it includes a plurality of modules, each of which has a central floating body (1) and a submerged captive-air (5) tank (4), attached to the central floating body (1).

11. System according to claim 1, wherein said central floating body (1) has a cavity containing captive air (7) inside it.

12. System according to claim 1, wherein it includes a plurality of peripheral floating bodies (2a, 2b, 2c), attached to said central floating body (1) by means of tilting attachment structures (16).

13. System according to claim 12, wherein said means of converting the movement into energy further include a plurality of pneumatic cylinders (17a, 17b, 17c, 21a, 21b) actuated by said tilting attachment structures (16).

14. System according to claim 12, wherein said peripheral floating bodies (2a, 2b, 2c) each include two peripheral pneumatic cylinders (21a, 21b) which compress the air from one of the cylinders (17a, 17b, 17c) of the central floating body (1), the tilting structure (16) of each one of the central floating body (1) cylinders (17a, 17b, 17c) including a bar (19) articulated at one end onto the rod of said cylinder (17) and at the other end onto a lever (20) whose ends are in turn articulated onto the ends of the peripheral pneumatic cylinder (21a, 21b) rods, with the distance between the two points of articulation onto said bar (19) being substantially the same as the distance between the crest and the trough of a wave.

15. System according to claim 14, wherein one of the two peripheral pneumatic cylinders (21a, 21b) compresses the air from the other peripheral pneumatic cylinder.

16. System according to claim 15, wherein each one of the pneumatic cylinders (17a, 17b, 17c) of the central floating body (1) and the two corresponding peripheral pneumatic cylinders (21*a*, 21*b*) constitutes three-stage linear pneumatic pumps.

17. System according to claim 8, wherein the compressed air produced by the system is stored in the chambers of each one of said peripheral floating bodies (2*a*, 2*b*, 2*c*).

18. System according to claim 8, wherein the system further includes a number of reverse osmosis membranes for directly converting the hydraulic energy obtained into desalinated water.

* * * * *